United States Patent
Krompasky (10) Patent No.: US 10,680,485 B2
(45) Date of Patent: Jun. 9, 2020

(54) ENCASED ELECTRONIC ROTATING MACHINE

(71) Applicant: Siemens Aktiengesellschaft, München (DE)

(72) Inventor: Erik Krompasky, Hovorcovice (CZ)

(73) Assignee: SIEMENS AKTIENGESELLSCHAFT, München (DE)

( * ) Notice: Subject to any disclaimer, the term of this patent is extended or adjusted under 35 U.S.C. 154(b) by 78 days.

(21) Appl. No.: 15/740,270

(22) PCT Filed: May 31, 2016

(86) PCT No.: PCT/EP2016/062224
§ 371 (c)(1),
(2) Date: Dec. 27, 2017

(87) PCT Pub. No.: WO2017/001131
PCT Pub. Date: Jan. 5, 2017

(65) Prior Publication Data
US 2018/0183295 A1 Jun. 28, 2018

(30) Foreign Application Priority Data

Jul. 2, 2015 (EP) .................................... 15174959

(51) Int. Cl.
*H02K 3/38* (2006.01)
*H02K 5/132* (2006.01)
(Continued)

(52) U.S. Cl.
CPC ............... *H02K 5/128* (2013.01); *H02K 3/28* (2013.01); *H02K 3/38* (2013.01); *H02K 5/132* (2013.01); *H02K 15/02* (2013.01); *H02K 15/022* (2013.01)

(58) Field of Classification Search
CPC .......... H02K 5/128; H02K 15/02; H02K 3/28; H02K 3/38; H02K 5/132; H02K 15/022
(Continued)

(56) References Cited

U.S. PATENT DOCUMENTS 4,492,884 A * 1/1985 Asano .................... H02K 5/128
264/272.13
4,831,297 A   5/1989 Taylor et al.
(Continued)

FOREIGN PATENT DOCUMENTS

CN       103997150 A    8/2014
DE   102008043386 A1    5/2010
(Continued)

OTHER PUBLICATIONS

"PCT International Search Report and Written Opinion of International Searching Authority dated Aug. 12, 2016 corresponding to PCT International Application No. PCT/EP2016/062224 filed May 31, 2016".

*Primary Examiner* — Naishadh N Desai
(74) *Attorney, Agent, or Firm* — Henry M. Feiereisen LLC (57) ABSTRACT

The invention relates to an electric rotating machine (10) comprising a rotor (7), a stator (1) surrounding the rotor (7), and an air gap (6) between the rotor (7) and the stator (1). In order to obtain high efficiency and a compact design, the stator (1) has stator windings (13) that are encased, and the stator (1) immediately adjoins the air gap (6).

19 Claims, 5 Drawing Sheets

(51) Int. Cl.
*H02K 5/128* (2006.01)
*H02K 15/02* (2006.01)
*H02K 3/28* (2006.01)

(58) Field of Classification Search
USPC .................................................. 310/86–88
See application file for complete search history.

(56) References Cited

U.S. PATENT DOCUMENTS

| | | | |
|---|---|---|---|
| 5,117,138 A | 5/1992 | Trian | |
| 6,069,421 A * | 5/2000 | Smith | H02K 5/128 29/596 |
| 6,759,774 B1 * | 7/2004 | Griggs | H02K 5/124 310/87 |
| 2005/0074548 A1 | 4/2005 | Puterbaugh et al. | |
| 2005/0200227 A1 * | 9/2005 | Fujishima | H02K 1/185 310/89 |
| 2006/0082230 A1 * | 4/2006 | Bevington | H02K 5/132 310/72 |
| 2006/0250037 A1 | 11/2006 | Kummlee | |
| 2008/0042502 A1 * | 2/2008 | VanLuik | H02K 1/32 310/89 |
| 2010/0201129 A1 * | 8/2010 | Holstein | F03B 13/264 290/53 |
| 2011/0115314 A1 * | 5/2011 | Du | H02K 1/148 310/50 |
| 2012/0025646 A1 * | 2/2012 | Sheeran | H02K 3/30 310/88 |
| 2012/0267967 A1 * | 10/2012 | Trago | H02K 1/185 310/43 |
| 2012/0286606 A1 * | 11/2012 | Moulin | F16C 32/047 310/86 |
| 2014/0232212 A1 | 8/2014 | Miyamoto et al. | |
| 2015/0357885 A1 * | 12/2015 | Koiwai | H02K 11/25 310/68 C |
| 2016/0156241 A1 * | 6/2016 | Grubel | H02K 3/345 310/208 |

FOREIGN PATENT DOCUMENTS

| | | | | |
|---|---|---|---|---|
| EP | 0412858 A1 | | 2/1991 | |
| EP | 2511532 A1 * | | 10/2012 | ........... F04D 29/053 |
| JP | H04295257 A | | 10/1992 | |
| JP | 2001037134 A | | 2/2001 | |
| JP | 2002315253 A | | 10/2002 | |
| JP | 2003143810 A | | 5/2003 | |
| JP | 2007028850 A | | 2/2007 | |
| KR | 20080082506 A * | | 9/2008 | ........... C22C 38/001 |
| RU | 130158 U1 | | 7/2013 | |
| WO | WO 2004107532 A1 | | 12/2004 | |
| WO | WO 2008046817 A1 | | 4/2008 | |

* cited by examiner

ENCASED ELECTRONIC ROTATING MACHINE

CROSS-REFERENCES TO RELATED APPLICATIONS

This application is the U.S. National Stage of International Application No. PCT/EP2016/062224, filed May 31, 2016, which designated the United States and has been published as International Publication No. WO 2017/001131 and which claims the priority of European Patent Application, Serial No. 15174959.5, filed Jul. 2, 2015, pursuant to 35 U.S.C. 119(a)-(d).

BACKGROUND OF THE INVENTION

The invention relates to an electric rotating machine comprising a rotor, a stator surrounding the rotor, and an air gap between the rotor and the stator.

The invention also relates to a compressor drive, ship or submarine having at least one encased (encapsulated) electric rotating machine of the aforesaid type.

The invention further relates to a method for producing an encapsulated stator.

An encapsulated electric rotating machine of the aforesaid type finds application for example in a, preferably integrated, compressor drive, wherein the drive itself is immersed in a gas atmosphere. The gaseous medium that is to be conveyed, natural gas for example, may contain aggressive substances which can attack the stator, in particular the stator windings, or the rotor, in particular the rotor windings.

An encapsulated electric rotating machine of the aforesaid type also finds application in ship propulsion drives, wherein seawater is circulated around the stator, for example in order to cool the latter. The stator and/or rotor may also be attacked by the salt contained in the seawater.

An electric machine comprising a stator encapsulated in a pressure-resistant enclosure for an integrated compressor drive is known from the published unexamined German patent application WO 2004/107532 A1, wherein the winding overhangs of the stator are embedded in a solid bracing structure on which the encapsulation is supported.

An encapsulated electric machine is known from the published unexamined German patent application WO 2008/046817 A1, wherein, in order to ensure efficient cooling, the stator has a liquid cooling apparatus comprising a corresponding stator cooling circuit, wherein the encapsulation forms a part of the outer wall of the cooling circuit.

A submersible electric propulsion motor which includes a sealed cylindrical stator housing is known from the patent specification U.S. Pat. No. 4,831,297 A.

An electric machine having a fully encapsulated stator is known from the patent specification U.S. Pat. No. 4,831,297 A, wherein a composite layer is interposed between the stator and an air gap.

A method for producing a stator is known from the published unexamined German patent application DE 10 2008 043386 A1, wherein a laminated yoke core and a star-type laminated stator core are connected to one another in a force-fit manner, for example by thermal shrinking, or in a form-fit manner, by means of recesses in the laminated yoke core for the ends of the stator teeth.

SUMMARY OF THE INVENTION

The object underlying the invention is to provide an electric rotating machine having encapsulated stator windings which, in comparison with the prior art, features high efficiency and a compact design.

This object is achieved by means of an electric rotating machine comprising a rotor, a stator surrounding the rotor, and an air gap between the rotor and the stator, wherein the stator has stator windings that are encapsulated, and wherein the stator is immediately adjacent to the air gap.

The air gap is suitable for air, other gases and liquids to flow therethrough, because the stator is free of encapsulation on the inner lateral surface facing toward the rotor in the region of the air gap and has no encapsulation.

The encapsulation protects the stator windings against gases and liquids of any kind that circulate around the machine and are used for example for cooling and/or processing purposes. Because the stator is immediately adjacent to the air gap, the air gap is optimally small. An ideally small air gap leads to optimal performance parameters, for example an ideal power efficiency, of the encapsulated electric rotating machine. On account of the high efficiency it is furthermore possible to utilize a smaller encapsulated electric rotating machine to achieve a required level of performance, thereby saving on installation space.

The object is also achieved by means of a ship or submarine having at least one electric rotating machine of the aforesaid type.

A compact, performance-efficient encapsulated electric rotating machine increases the range of a ship or submarine of the aforesaid type and less space is required for the propulsion drive of the ship or submarine.

The object is further achieved by means of a method for producing an electric rotating machine of the aforesaid type.

The advantages and preferred embodiments cited hereinafter in relation to the rotor may be applied analogously to the production method.

In a preferred embodiment variant, the stator windings extend through the stator and have stator winding overhangs at the axial ends of the stator, in which arrangement the stator winding overhangs are encapsulated by a stator winding overhang encapsulation. The encapsulation protects the stator winding overhangs against gases and liquids of any kind that circulate around the machine and are used for example for cooling and/or processing purposes.

Preferably, the stator winding overhang encapsulation is connected to the stator laterally at the axial ends of the stator. This is advantageous, because in particular the size of the air gap is not affected as a result of a connection of said type joining the stator winding overhang encapsulation to the stator, and optimal performance parameters are achieved during the operation of the electric rotating machine.

In an advantageous embodiment, only the stator winding overhangs are surrounded by the stator winding overhang encapsulation. The stator windings in the region of the stator are protected from gases and liquids by the stator itself, for example.

In a further advantageous embodiment, the stator has a stator yoke and a laminated stator core surrounding the stator yoke, wherein the stator windings extend through the stator yoke and the stator yoke is immediately adjacent to the air gap. Since the stator yoke directly adjoins the air gap, the air gap is ideally small, which leads to optimal performance parameters, for example an ideal power efficiency, of the submersible electric rotating machine. Owing to the high degree of efficiency it is furthermore possible to utilize a smaller encapsulated electric rotating machine to achieve a required level of performance, thereby saving on installation space.

In a particularly advantageous embodiment, the stator yoke is fixedly connected to the laminated stator core, in which arrangement the stator windings in the region of the stator are sealed by means of the stator yoke and the laminated stator core fixedly connected to the stator yoke. As a result of the fixed connection of the stator yoke to the laminated stator core, the stator windings are sealed in a fluid-tight manner, that is to say are impervious to the ingress of gases and liquids. Owing to a seal of said type, no additional encapsulation material is required in the region of the stator.

Preferably, the laminated stator core is fixedly connected to the stator yoke with the aid of a force-fit connection, in particular a shrink-fit connection. In a shrink-fitting process, the laminated stator core is preferably heated, by several hundred degrees Celsius for example, as a result of which the inner diameter of the laminated stator core is increased due to thermal expansion. Having increased in size due to the thermal expansion, the laminated stator core is pulled over the stator yoke in the heated state. As the laminated stator core cools, a heat shrinking process, also known as thermal contraction, takes place, as a result of which the laminated stator core returns to its former size and is connected to the stator yoke in a manner that is both mechanically secure and electrically conducting. This is particularly advantageous, since in this way a mechanically fixed and electrically conductive connection is established without additional process steps. Furthermore, said connection is compact, highly stable and virtually independent of external influences.

Particularly advantageously, the stator winding overhang encapsulation contains an abrasion-resistant material. Since the gas or liquid may also contain particles which can lead to abrasion of the stator winding overhang encapsulation, it is advantageous if the stator winding overhang encapsulation contains an abrasion-resistant material.

In a preferred embodiment variant, the stator winding overhang encapsulation contains a corrosion-resistant material. This is particularly advantageous, since the corrosion-resistant material results in the stator winding overhang encapsulation and consequently also the stator winding overhang being protected from decomposition due for example to aggressive gases or liquids.

Particularly advantageously, the encapsulated stator windings are surrounded by a cooling liquid, in particular oil. This enables the stator windings to be cooled very efficiently, since in this way the heat can be dissipated quickly and effectively, for example by means of cooling water flowing around the machine.

In a further advantageous embodiment, the stator winding overhang encapsulation is connected to the stator yoke and/or to the laminated stator core by way of a stator welded seam. Said welded joint is particularly advantageous, because it is not only electrically conductive but also mechanically stable. Furthermore, it seals the space around the stator winding overhang very effectively.

In a preferred embodiment variant, the rotor has rotor windings that extend through the rotor and are encapsulated, in which arrangement the rotor is immediately adjacent to the air gap. In particular in the case of very high power outputs of more than one megawatt, use is very often made of separately excited synchronous machines which preferably have a rotor with rotor windings. As a result of the encapsulation, the rotor windings, just like the stator windings, are protected against gases and liquids of any kind that flow around the machine and are used for example for cooling and/or processing purposes. Because the rotor is immediately adjacent to the air gap, the air gap is optimally small, thereby leading to optimal performance parameters, for example an ideal power efficiency. On account of the high degree of efficiency promoted by the small air gap it is furthermore possible to save on installation space.

In an advantageous embodiment, the rotor windings have a rotor winding overhang, in which arrangement only the rotor winding overhangs are surrounded by a rotor winding overhang encapsulation. As a result of the encapsulation, the rotor winding overhang is protected against gases and liquids of any kind that flow around the machine, in particular the rotor winding overhang.

Preferably, the rotor winding overhang encapsulation is connected to the rotor only laterally at the axial ends of the latter. The rotor windings in the region of the rotor are protected from gases and liquids by the rotor itself, for example.

Particularly advantageously, the rotor winding overhang encapsulation contains an abrasion-resistant and/or a corrosion-resistant material. This is particularly advantageous, because the rotor winding overhang encapsulation and consequently also the rotor winding overhang are protected by the corrosion-resistant material from decomposition due for example to aggressive gases and liquids. Since the gas or liquid may also contain particles that can lead to abrasion of the stator winding overhang encapsulation, it is advantageous if the stator winding overhang encapsulation contains an abrasion-resistant material.

Particularly advantageously, the rotor winding overhang encapsulation is connected to the rotor by way of a rotor welded seam. Said welded joint is particularly advantageous, because it is both electrically conductive and mechanically stable. Furthermore, it seals the space around the rotor winding overhang very effectively.

In a preferred embodiment variant, the encapsulated rotor windings are surrounded by a cooling liquid, in particular oil. This enables the rotor windings to be cooled very efficiently, since in this way the heat can be dissipated quickly and effectively.

Particularly advantageously, a first inner lateral surface of the laminated stator core is fixedly connected to a second outer lateral surface of the stator yoke with the aid of a shrink-fitting process. This is particularly advantageous, since in this way the windings inserted into the stator yoke are completely enclosed inside the rotor and consequently are protected from decomposition due for example to aggressive gases and liquids.

Advantageously, the stator yoke is provided to be immediately adjacent with a second inner lateral surface to an air gap. Because the stator yoke is immediately adjacent to the air gap, the air gap is optimally small. An ideally small air gap leads to optimal performance parameters.

BRIEF DESCRIPTION OF THE DRAWING

The invention is described and explained in more detail below with reference to the exemplary embodiments illustrated in the figures, in which.

DETAILED DESCRIPTION OF PREFERRED EMBODIMENTS

Figure 1:
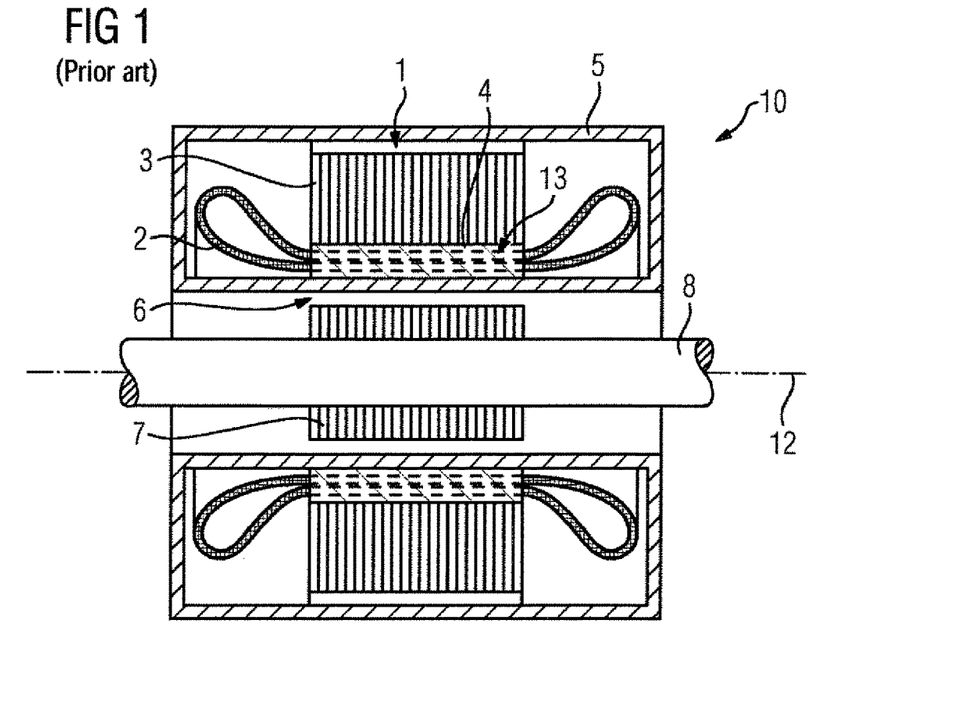
FIG. 1 shows a longitudinal sectional view of an encapsulated electric rotating machine according to the prior art.

FIG. 1 shows a longitudinal sectional view of an encapsulated electric rotating machine 10 according to the prior art, wherein the stator 1 is encapsulated. In addition to the stator 1, the electric rotating machine 10 has a rotor 7 which is connected in a rotationally fixed manner to a shaft 8. The shaft rotates about an axis of rotation 12 which defines an axial direction, a radial direction and a circumferential direction. Stator 1 and rotor 7 are separated by an air gap 7. The stator 3 has a stator yoke 4 in which the stator windings 13 extend. The stator yoke 4 is an assembly constructed of individual profiled sheets, which are layered, stamped and subsequently welded together. Furthermore, the stator yoke 4, which is fabricated from a ferromagnetic material such as iron or steel, is magnetically conductive. The stator windings 13 are preferably inserted into upwardly open slots of the stator yoke 4. A laminated stator core 3, which is likewise fabricated from a ferromagnetic material such as iron or steel, surrounds the stator yoke 4 and is connected to the latter in an electrically conducting and mechanically fixed manner. The stator windings 13, which are preferably made of copper, have stator winding overhangs 2 at the axial ends of the stator yoke 4.

A stator encapsulation 5 encloses the entire stator 1 and hermetically seals the stator. The stator encapsulation 5 also extends through the air gap 6 between the stator 1 and the rotor 7. In order to achieve a high power efficiency for the encapsulated electric rotating machine 10, the air gap 6 should be kept as small as possible. An additional material between the stator and the rotor accordingly has a detrimental effect on the efficiency of the encapsulated electric rotating machine 10.

Figure 2:
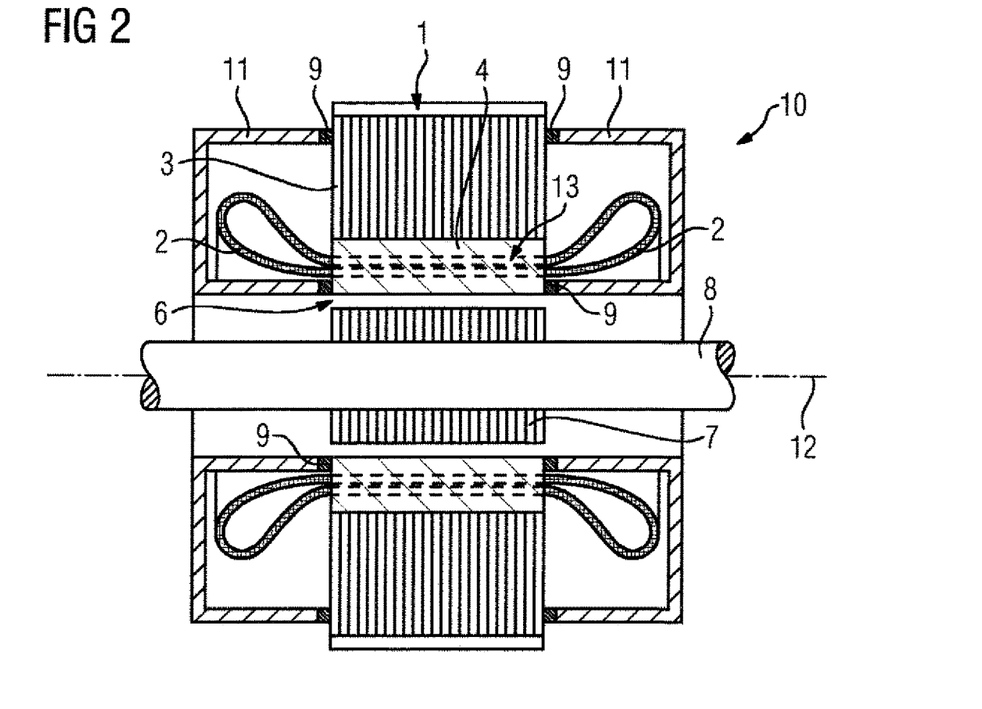
FIG. 2 shows a longitudinal sectional view of a first embodiment variant of an encapsulated electric rotating machine.

FIG. 2 shows a longitudinal sectional view of a first embodiment variant of an encapsulated electric rotating machine 1, wherein the configuration of the electric rotating machine 1 corresponds to that from FIG. 1. Here, however, a stator encapsulation 5 that hermetically seals the entire stator 1 is dispensed with. Instead, the stator winding overhangs 2 are surrounded by stator winding overhang encapsulations 11, which are welded to the stator yoke 4 and the laminated stator core 3 by means of stator welded seams 9. By means of the stator yoke 4, the laminated stator core 3 and the stator winding overhang encapsulations 11 welded to the stator yoke 4 and the laminated stator core 3, the stator windings 13 together with their stator winding overhangs 2 are hermetically encapsulated, as a result of which they are protected against gases and liquids of any kind that flow around the encapsulated electric rotating machine 1. In the case of integrated compressor drives, in which the drive itself is contained in a gas atmosphere, a natural gas that is to be conveyed may for example contain aggressive substances that can attack the stator 1, in particular the stator windings 13. In the case of ship propulsion drives also, in which seawater is circulated around the stator 1, for example in order to provide better cooling, the salt contained in the seawater can attack the stator windings 13. Furthermore, the air gap 6 is optimally small because the stator 1 is immediately adjacent to the air gap 6. An ideally small air gap 6 leads to optimal performance parameters of the encapsulated electric rotating machine 1. Owing to the high degree of efficiency it is furthermore possible to utilize a smaller encapsulated electric rotating machine 1 to achieve a required level of performance, thereby saving on installation space. To provide better heat dissipation, the encapsulated stator windings 13 together with their stator winding overhangs 2 are surrounded by a cooling liquid, in particular oil.

The stator winding overhang encapsulation 11 contains a corrosion-resistant material which is chemically resistant to the gases and liquids that flow around the encapsulated electric rotating machine 1 and which forms a chemical barrier between the flowing substances and the stator windings 13 with their stator winding overhangs 2. In addition, the stator winding overhang encapsulation 11 contains an abrasion-resistant material, preferably on the surface, which prevents the particles occurring in the liquids and gases that flow around the encapsulated electric rotating machine 1 from damaging the stator winding overhang encapsulation 11 through abrasion or attrition. Suitable abrasion-resistant materials include nickel or dense plastics, for example polyether ether ketone (PEEK for short).

The stator winding overhang encapsulation 11 should furthermore exhibit good thermal conductivity so that the heat losses from the stator winding overhangs 2 can be dissipated efficiently to a cooling medium flowing around the encapsulated electric rotating machine 1.

Figure 3:
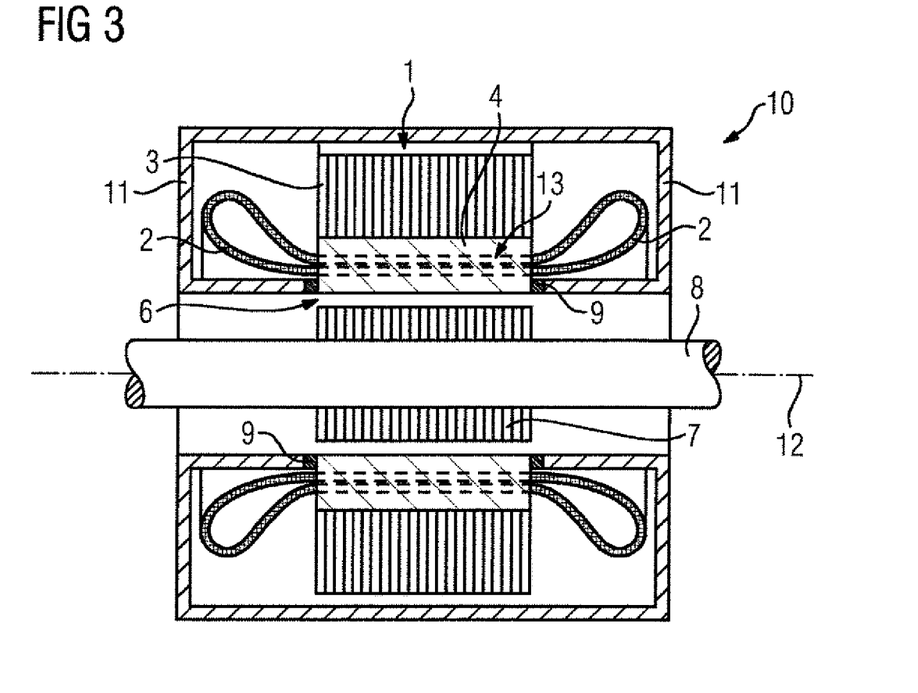
FIG. 3 shows a longitudinal sectional view of a second embodiment variant of an encapsulated electric rotating machine.

FIG. 3 shows a longitudinal sectional view of a second embodiment variant of an encapsulated electric rotating machine 1, wherein the configuration of the electric rotating machine 1 corresponds to that from FIG. 1 and FIG. 2. Here, however, a stator encapsulation 5 that hermetically seals the entire stator 1 is likewise dispensed with. Instead, the stator winding overhangs 2 are surrounded by a stator winding overhang encapsulation 11 which is welded to the stator yoke 4 at the axial ends of the stator yoke 4 with the aid of stator welded seams 9. Furthermore, in contrast to the first embodiment variant from FIG. 2, the stator winding overhang encapsulation 11 encloses the laminated stator core 3 of the stator 1 completely on the external side of the stator 1 and in this way likewise hermetically seals the laminated stator core 3.

Figure 4:
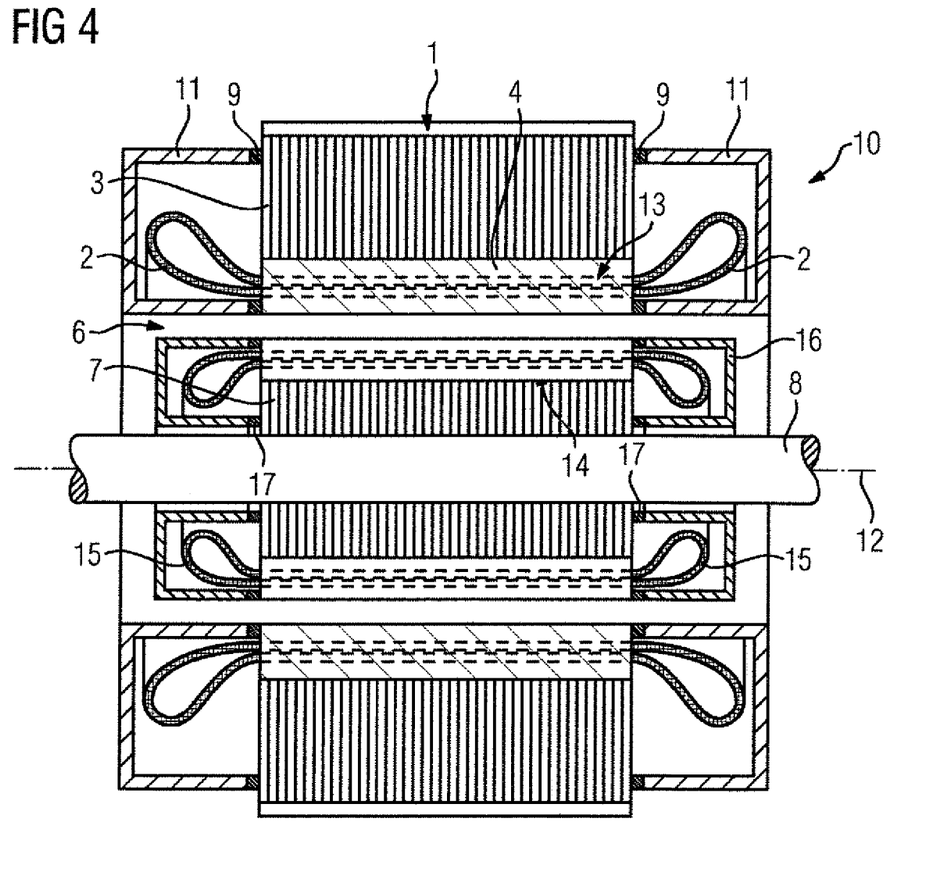
FIG. 4 shows a longitudinal sectional view of a third embodiment variant of an encapsulated electric rotating machine.

FIG. 4 shows a longitudinal sectional view of a third embodiment variant of an encapsulated electric rotating machine 1. The configuration of the electric rotating machine 1 corresponds to that from FIG. 1 to FIG. 3. The encapsulation on the stator side is realized in an analogous manner to FIG. 2. Since the encapsulated electric rotating machine 1 in FIG. 4 is a separately excited synchronous machine, the rotor 7 also has rotor windings 14 which extend through the rotor 7. The rotor windings 14 have rotor winding overhangs 15 at the axial ends of the rotor 7.

The rotor windings 14 are hermetically encapsulated by the rotor 7, which surrounds the rotor windings 14, and by rotor winding overhang encapsulations 16. In this arrangement, the rotor winding overhang encapsulations 16 are welded to the rotor 7 at the axial ends of the latter by way of rotor welded seams 17 and are hermetically sealed thereby. As a result of the hermetic sealing, they are protected against gases and liquids of any kind that flow around the encapsulated electric rotating machine 1. In the case of integrated compressor drives, in which the drive itself is contained in a gas atmosphere, a natural gas that is to be conveyed may for example contain aggressive substances that can attack the rotor 7, in particular the rotor windings 14. In the case of ship propulsion drives also, in which seawater is circulated around the rotor, the salt contained in the seawater can attack the rotor windings 14. Furthermore, the air gap 6 is optimally small because the rotor 7 is immediately adjacent to the air gap 6. An ideally small air gap 6 leads to optimal performance parameters of the encapsulated electric rotating machine 1.

Figure 5:
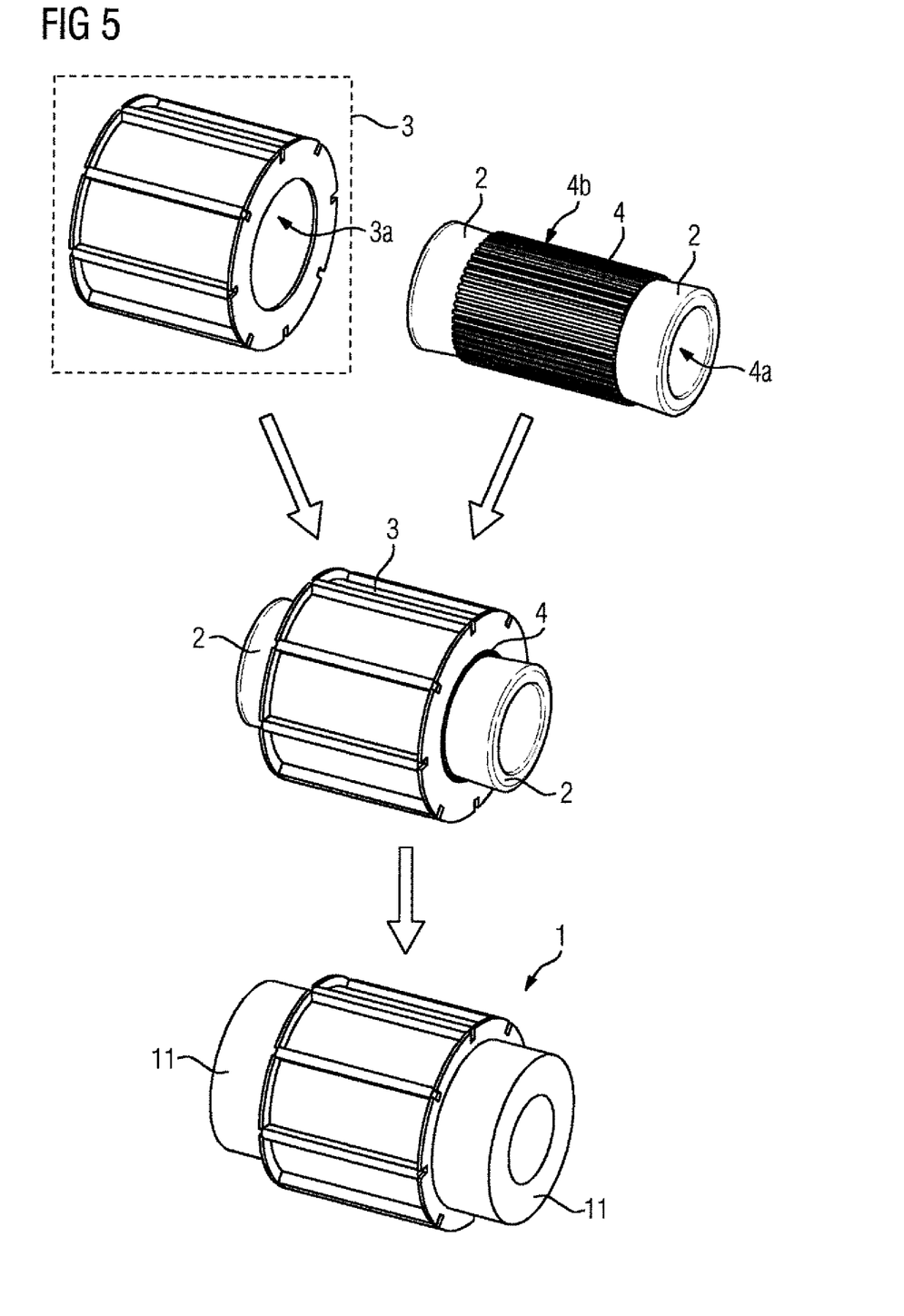
FIG. 5 shows the schematic workflow of a production method for fabricating an encapsulated stator.

FIG. 5 shows the schematic workflow of a production method for fabricating an encapsulated stator 1. In a first fabrication step, the laminated stator core 3 is layered, stamped and subsequently welded together from a plurality of individual sheets that comprise a ferromagnetic material such as iron or steel. The laminated stator core 3 has a first inner lateral surface 3a. In a further fabrication step, the stator yoke 4 is likewise fabricated from a ferromagnetic material, for example iron or steel, from a plurality of individual profiled sheets, which are layered, stamped and subsequently welded together, and is magnetically conductive. The stator yoke 4 has a second inner lateral surface 4a and a second outer lateral surface 4b. In a further step, the stator windings 13, which are preferably made of copper, are inserted into the upwardly open slots of the stator yoke 4. The inserted stator windings 13 have stator winding overhangs 2 at the axial ends of the stator yoke 4. In the next fabrication step, the finished laminated stator core 3 is fixedly connected to the stator yoke 4 with the aid of a shrink-fitting process. In said shrink-fitting process, the laminated stator core 3 is heated by several hundred degrees Celsius, as a result of which the inner diameter of the laminated stator core 3 is increased due to thermal expansion. Having increased in size due to the thermal expansion, the laminated stator core 3 is pulled over the stator yoke 4 in the heated state in such a way that the first inner lateral surface 3a of the laminated stator core 3 is connected to the second outer lateral surface 4b of the stator yoke 4. As the laminated stator core 3 cools, a heat shrinking process, also known as thermal contraction, takes place, as a result of which the laminated stator core 3 returns to its former size and is connected to the stator yoke 4 in a manner that is both mechanically secure and electrically conducting. This is particularly advantageous, since in this way a mechanically fixed and electrically conductive connection is established without additional process steps. In a further fabrication step, a stator winding overhang encapsulation 11 is arranged over a stator winding overhang 2 and welded to the stator yoke 4 and to the laminated stator core 3 by way of stator welded seams 9. Alternatively, the stator winding overhang encapsulation 11 may be soldered or joined in some other way in order to achieve a hermetic sealing of the stator windings 13 by way of the laminated stator core 3, the stator yoke 4 and the stator winding overhang encapsulation 11. This is advantageous, since in this way the stator windings 13 of the stator 1 inserted into the stator yoke 4 are completely enclosed and therefore protected from decomposition due for example to aggressive gases and liquids. The stator winding overhang encapsulation 11 contains a corrosion-resistant material which is chemically resistant to the gases and liquids flowing around the encapsulated electric rotating machine 1 and which forms a chemical barrier between the flowing substances and the stator windings 13 together with their stator winding overhangs 2. In addition, the stator winding overhang encapsulation 11 contains an abrasion-resistant material, preferably on the surface, which prevents the particles occurring in the liquids and gases that flow around the encapsulated electric rotating machine 1 from damaging the stator winding overhang encapsulation 11 through abrasion or attrition. Suitable abrasion-resistant materials include nickel or dense plastics, for example polyether ether ketone (PEEK for short).

Figure 6:
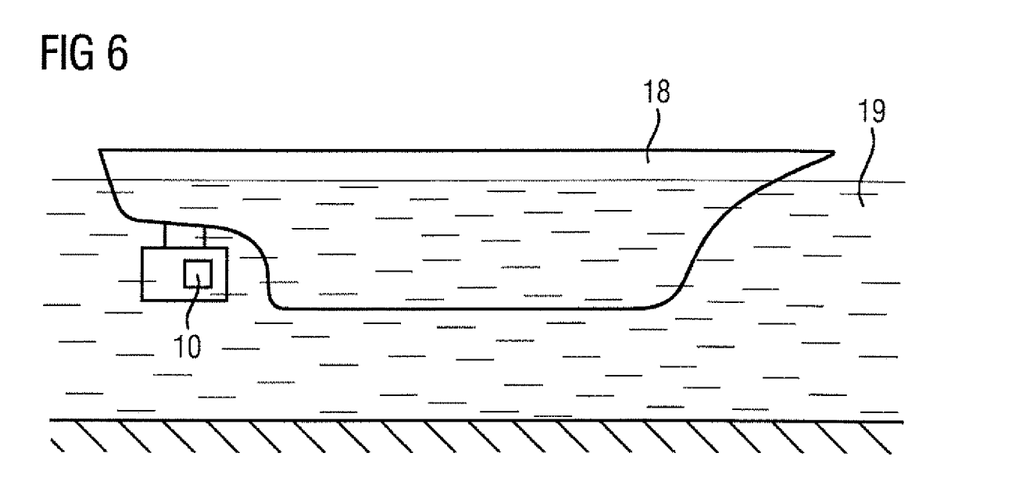
FIG. 6 shows a longitudinal sectional view of a ship having four encapsulated electric rotating machines.

FIG. 6 shows a longitudinal sectional view of a ship 18 having an encapsulated electric rotating machine 10. As shown in one of FIGS. 1 to 4, the encapsulated electric rotating machine 10 is designed to be submersible and is disposed completely under water 19. It has flowing around it, for example, saline seawater, which is preferably used for cooling. In this scenario, the encapsulated electric rotating machine 10 serving as a motor can be used as a ship propulsion drive either directly or via a transmission system.

Figure 7:
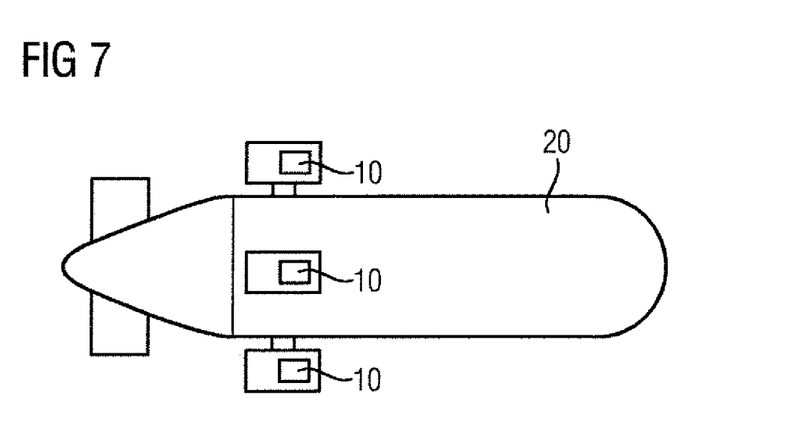
FIG. 7 shows a side view of a submarine having an encapsulated electric rotating machine.

FIG. 7 shows a side view of a submarine 20 having, by way of example, four encapsulated electric rotating machines 10. As shown in one of FIGS. 1 to 4, the encapsulated electric rotating machines 10 are likewise designed to be submersible and are arranged offset by 90° in the circumferential direction at the rearward part of the submarine 20. Further arrangements having at least one electric rotating machine 10 mounted on a submarine 20 are possible. The four encapsulated electric rotating machines 10 are disposed completely under water 19 and have, for example, saline seawater flowing around them, which seawater is preferably used for cooling. In this scenario, the encapsulated electric rotating machines 10 serving as a motor can be used as a ship propulsion drive either directly or via a transmission system.

What is claimed is:

1. An electric rotating machine, in particular an encapsulated electric rotating machine, comprising:
    a rotor; and
    a stator in surrounding relation to the rotor and defining with the rotor an air gap there between, said stator including a stator yoke disposed immediately adjacent to the air gap, a laminated stator core in surrounding relation to the stator yoke, and encapsulated stator windings extending through the stator yoke,
    wherein the stator windings extend through the stator and have stator winding overhangs at axial ends of the stator, and further comprising a stator winding overhang encapsulation configured to encapsulate the stator winding overhangs without being directly in contact with the stator winding overhangs,
    wherein the stator winding overhang encapsulation is connected to the stator only laterally at the axial ends of the stator and the stator yoke by way of a stator welded seam, so that the stator is not entirely sealed by the stator winding overhang encapsulation.

2. The electric rotating machine of claim 1, wherein the stator winding overhang encapsulation is configured to only surround the stator winding overhangs.

3. The electric rotating machine of claim 1, wherein the stator yoke is fixedly connected to the laminated stator core, said stator windings being sealed in a region of the stator by the stator yoke and the laminated stator core.

4. The electric rotating machine of claim 1, wherein the laminated stator core is fixedly connected to the stator yoke via a force-fit connection, in particular a shrink-fit connection.

5. The electric rotating machine of claim 1, wherein the stator winding overhang encapsulation is fixedly connected at least to the stator yoke.

6. The electric rotating machine of claim 1, wherein the stator winding overhang encapsulation contains an abrasion-resistant material.

7. The electric rotating machine of claim 1, wherein the stator winding overhang encapsulation contains a corrosion-resistant material.

8. The electric rotating machine of claim 1, wherein the encapsulated stator windings are surrounded by a cooling liquid, in particular oil.

9. The electric rotating machine of claim 1, wherein the rotor includes rotor windings which extend through the rotor and are encapsulated, said rotor being disposed immediately adjacent to the air gap.

10. The electric rotating machine of claim 9, wherein the rotor windings have rotor winding overhangs, respectively, and further comprising a rotor winding overhang encapsulation configured to only surround the rotor winding overhangs.

11. The electric rotating machine of claim 10, wherein the rotor winding overhang encapsulation is connected to the rotor only laterally at axial ends of the rotor.

12. The electric rotating machine of claim 10, wherein the rotor winding overhang encapsulation is connected to the rotor by a rotor welded seam.

13. The electric rotating machine of claim 10, wherein the rotor winding overhang encapsulation contains an abrasion-resistant material.

14. The electric rotating machine of claim 10, wherein the rotor winding overhang encapsulation contains a corrosion-resistant material.

15. The electric rotating machine of claim 9, wherein the encapsulated rotor windings are surrounded by a cooling liquid, in particular oil.

16. A compressor drive, ship or submarine, comprising at least one electric rotating machine comprising a rotor, and a stator in surrounding relation to the rotor and defining with the rotor an air gap there between, said stator including a stator yoke disposed immediately adjacent to the air gap, a laminated stator core in surrounding relation to the stator yoke, and encapsulated stator windings extending through the stator yoke, wherein the encapsulated stator windings extend through the stator and have stator winding overhangs at axial ends of the stator, and further comprising a stator winding overhang encapsulation configured to encapsulate the stator winding overhangs without being directly in contact with the stator winding overhangs, wherein the stator winding overhand encapsulation is connected to the stator only laterally at the axial ends of the stator and the stator yoke by way of a stator welded seam, so that the stator is not entirely sealed by the stator winding overhang encapsulation.

17. A method for producing an electric rotating machine, comprising:
   placing a stator in surrounding relation to a rotor such as to define an air gap there between;
   disposing a stator yoke of the stator immediately adjacent to the air gap;
   disposing a laminated stator core of the stator in surrounding relation to the stator yoke;
   encapsulating stator windings of the stator; and
   extending the stator windings through the stator yoke,
   arranging a stator winding overhang encapsulation over a stator winding overhang of the stator windings without directly contacting the stator winding overhang; and
   connecting the stator and the stator yoke to the stator winding overhang encapsulation only laterally at axial ends of the stator and the stator yoke by way of a stator welded seam, so that the stator is not entirely sealed by the stator winding overhang encapsulation.

18. The method of claim 17, further comprising:
   inserting stator windings into the stator yoke; and
   fixedly connecting a laminated stator core to the stator yoke by a shrink-fitting process.

19. The method of claim 17, further comprising fixedly connecting an inner lateral surface of the laminated stator core to an outer lateral surface of the stator yoke by a shrink-fitting process.

* * * * *